(12) United States Patent
Jenkins

(10) Patent No.: US 6,397,732 B1
(45) Date of Patent: Jun. 4, 2002

(54) TOASTER-BEING SEE-THRU AND HAVING A PLURALITY OF DIFFERENT SIZED TOAST WELLS, ONE OF WHICH BEING ADJUSTABLE

(76) Inventor: Dierre B. Jenkins, 2115 Rockaway Pkwy., Brooklyn, NY (US) 11236

( * ) Notice: Subject to any disclaimer, the term of this patent is extended or adjusted under 35 U.S.C. 154(b) by 0 days.

(21) Appl. No.: 09/706,568

(22) Filed: Nov. 6, 2000

(51) Int. Cl.⁷ .............................................. A47J 37/08
(52) U.S. Cl. ........................... 99/341; 99/344; 99/391; 99/385
(58) Field of Search ........................ 99/391, 389, 388, 99/385, 392, 341, 344; 219/521, 385, 386, 389

(56) References Cited

U.S. PATENT DOCUMENTS

| | | | | |
|---|---|---|---|---|
| 2,717,951 A | * | 9/1955 | Swicker ..................... | 99/389 X |
| 5,193,439 A | * | 3/1993 | Finesman et al. .......... | 99/391 X |
| 5,414,243 A | * | 5/1995 | Snell et al. ............. | 99/329 P X |
| 6,123,012 A | * | 9/2000 | Hardin et al. ............. | 99/389 X |
| 6,125,234 A | * | 9/2000 | de Jenlis ................... | 99/389 X |
| 6,244,166 B1 | * | 6/2001 | Lebron ...................... | 99/389 X |
| 6,279,466 B1 | * | 8/2001 | Gort-Barten ................. | 99/389 |

OTHER PUBLICATIONS

US 2001/0016222, Patent Application Publication, Tomsich et al, Aug. 2001.*

* cited by examiner

*Primary Examiner*—Reginald L. Alexander

(57) ABSTRACT

A toaster that includes a housing, a carriage that is operatively connected in the housing for racking the bread to be toasted, an audio alarm that is operatively connected to the housing and in electrical communication with the timer for activating eight seconds before termination of toasting so as to give a user ample time to reach the toaster up until toasting is terminated so as to prevent the toasted bread from getting cold, a color selector that is operatively connected to the housing and in electrical communication with the carriage for selecting the color of the toasted bread. The housing has a top wall and is completely transparent for allowing viewing of all surfaces of the bread as it is being toasted. The top wall of the housing has four bread slots therethrough that include three fixed bread slots, each of which being of a different width for accommodating different sized and shaped breads and an adjustable bread slot for adjusting to accommodate for sized and shaped breads not fitting into any of the three fixed bread slots.

14 Claims, 1 Drawing Sheet

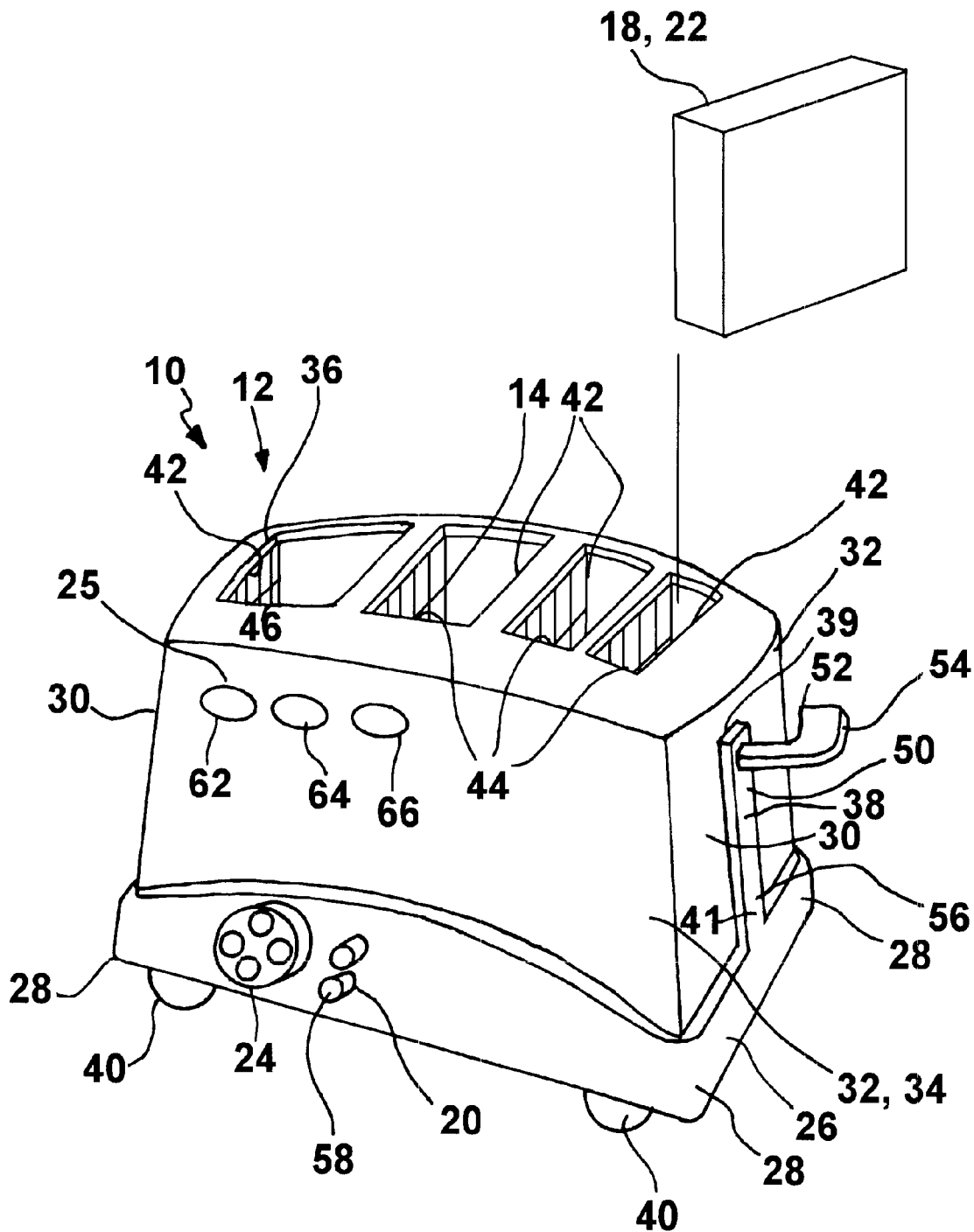

TOASTER-BEING SEE-THRU AND HAVING A PLURALITY OF DIFFERENT SIZED TOAST WELLS, ONE OF WHICH BEING ADJUSTABLE

BACKGROUND OF THE INVENTION

1. Field of the Invention

The present invention relates to a toaster. More particularly, the present invention relates to a toaster being see-thru and having a plurality of different sized toast wells, one of which being adjustable.

2. Description of the Prior Art

Numerous innovations for toasters have been provided in the prior art that will be described. Even though these innovations may be suitable for the specific individual purposes to which they address, however, they differ from the present invention.

FOR EXAMPLE, U.S. Pat. No. Des. 347,546 to Pawlowicz teaches the ornamental design for a toaster having adjustable openings.

ANOTHER EXAMPLE, U.S. Pat. No. Des. 379,899 to Barthelemy et al. teaches the ornamental design for a toaster with a window.

STILL ANOTHER EXAMPLE, U.S. Pat. No. Des. 389,371 to Thiebold et al. teaches the ornamental design for a toaster.

ANOTHER EXAMPLE, U.S. Pat. No. 5,138,938 to McClean teaches a sandwich toaster or griller in which the upper die mold half is constituted by a plurality of flat sheets of glass or other suitable material having between them an electric heater element consisting of a flat nichrome wire or a printed element parallel lengths which extend across the sheets of glass. The spacing of the lengths of heater element is such as to provide a more or less uniform toasting effect on the surface of the sandwich, the toasting of which is visible through the glass or other transparent sheets.

STILL YET ANOTHER EXAMPLE, U.S. Pat. No. 5,653,158 to Balandier et al. teaches a toasting or heating appliance, particularly an electrical food toasting or heating appliance such as a toaster, including a housing with a fixed toasting subassembly and a movable toasting subassembly moved by a holder to form a variable-width toasting slot, the holder including two side arms rotatably mounted at their ends on the housing, a bread rack axially movable in the slot, and a control handle which controls the movement of the movable bread rack and is combined with an actuating member for causing relative movement of the two subassemblies, wherein the appliance further includes at least one stabilizing arm arranged behind the movable subassembly and connected to the back thereof via a first hinge, as well as to the housing via a second hinge.

It is apparent that numerous innovations for toasters have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a toaster being see-thru and having a plurality of different sized toast wells, one of which being adjustable that avoids the disadvantages of the prior art.

ANOTHER OBJECT of the present invention is to provide a toaster being see-thru and having a plurality of different sized toast wells, one of which being adjustable that is simple and inexpensive to manufacture.

STILL ANOTHER OBJECT of the present invention is to provide a toaster being see-thru and having a plurality of different sized toast wells, one of which being adjustable that is simple to use.

BRIEFLY STATED, YET ANOTHER OBJECT of the present invention is to provide a toaster that includes a housing, a carriage that is operatively connected in the housing for racking the bread to be toasted, an audio alarm that is operatively connected to the housing and in electrical communication with the timer for activating eight seconds before termination of toasting so as to give a user ample time to reach the toaster up until toasting is terminated so as to prevent the toasted bread from getting cold, a color selector that is operatively connected to the housing and in electrical communication with the carriage for selecting the color of the toasted bread. The housing has a top wall and is completely transparent for allowing viewing of all surfaces of the bread as it is being toasted. The top wall of the housing has four bread slots therethrough that include three fixed bread slots, each of which being of a different width for accommodating different sized and shaped breads and an adjustable bread slot for adjusting to accommodate for sized and shaped breads not fitting into any of the three fixed bread slots.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The sole FIGURE of the drawing is a diagrammatic perspective view of the present invention.

LIST OF REFERENCE NUMERALS UTILIZED IN THE DRAWING

10 toaster of present invention being see-thru and having plurality of different sized toast wells, one of which being adjustable
12 housing
14 carriage for racking bread 18 to be toasted
18 bread to be toasted
20 timer for setting how long bread 18 is to be toasted so as to form toasted bread 22 with color
22 toasted bread with color
24 audio alarm for activating eight seconds before termination of toasting so as to give user ample time to reach toaster 10 up until toasting is terminated so as to prevent toasted bread 22 from getting cold
25 color selector for selecting color of toasted bread 22
26 base of housing 12
28 four corners of base 26 of housing 12
30 pair of end walls of housing 12
32 pair of side walls of housing 12
34 front panel of pair of side walls 32 of housing 12
36 top wall of housing 12
38 throughslot in one end wall of pair of end walls 30 of housing 12
39 upper extreme of throughslot 38 in one end wall of pair of end walls 30 of housing 12
40 four feet of housing 12

41 lower extreme of throughslot 38 in one end wall of pair of end walls 30 of housing 12
42 four bread slots in top wall 36 of housing 12
44 three fixed bread slots of four bread slots 42 in top wall 36 of housing 12 for accommodating different sized and shaped breads
46 adjustable bread slot of four bread slots 42 in top wall 36 of housing 12 for adjusting to accommodated sized and shaped breads not fitting into any of three fixed bread slots 44 of four bread slots 42 in top wall 36 of housing 12
48 bread guides of carriage 14 for maintaining bread 18 in proper orientation relative to housing 12
50 arm of carriage 14
52 end of arm 50 of carriage 14
54 lift knob of carriage 14 for conforming to thumb of user so as to allow arm 50 of carriage 14 to be selectively pushed down in throughslot 38 in one end wall of pair of end walls 30 of housing 12, to lower extreme 41 of throughslot 38 in one end wall of pair of end walls 30 of housing 12
56 lift lock of carriage 14 for allowing bread 18 captured in carriage 14 to be toasted until such time as timer 20 releases lift lock 56 of carriage 14 allowing carriage 14 to be released and biased upwardly for removal of toasted bread 22 therein
58 timer knob operating timer 20
60 speaker making audible audio alarm 24
62 light button operating color selector 26
64 medium button operating color selector 26
66 dark button operating color selector 26
68 slot size knob adjusting adjustable bread slot 46 of four bread slots 42 in top wall 36 of housing 12

DETAILED DESCRIPTION OF THE PREFERRED EMBODIMENT

Referring now to the sole figure of the drawing, which is a diagrammatic perspective view of the present invention, the toaster of the present invention is shown generally at 10 for bread 18 so as to form toasted bread 22 with a color.

The configuration of the toaster 10 can best be seen in the sole figure of the drawing, which again is a diagrammatic perspective view of the present invention, and as such, will be discussed with reference thereto.

The toaster 10 comprises a housing 12, and a carriage 14 that is operatively connected in the housing 12 for racking the bread 18 to be toasted.

The housing 12 is completely transparent so as to form a transparent housing for allowing viewing of all surfaces of the bread 18 as it is being toasted.

The transparent housing 12 is made from heat-proof glass for preventing burns.

The toaster 10 further comprises a timer 20 that is operatively connected to the housing 12 for setting how long the bread 18 is to be toasted so as to form the toasted bread 22.

The toaster 10 further comprises an audio alarm 24 that is operatively connected to the housing 12 and in electrical communication with the timer 20 for activating eight seconds before termination of toasting so as to give a user ample time to reach the toaster 10 up until the toasting is terminated so as to prevent the toasted bread 22 from getting cold.

The toaster 10 further comprises a color selector 25 that is operatively connected to the housing 12 and in electrical communication with the carriage 14 for selecting the color of the toasted bread 22.

The housing 12 is rectangular-parallelepiped-shaped, and as a result thereof, has a base 26 that is horizontally-oriented and has four corners 28, a pair of end walls 30 that are vertically-oriented and extend upwardly from the base 26 thereof, a pair of side walls 32 that are vertically-oriented and extend upwardly from the base 26 thereof, of which one is a front panel 34, and a top wall 36 that is horizontally-oriented and extends across the pair of end walls 30 thereof and the pair of side walls 32 thereof.

One end wall 30 of the housing 12 has a throughslot 38 that is slender, extends vertically therethrough, from an upper extreme 39 thereof, which is short of the top wall 36 of the housing 12, to a lower extreme 41 thereof, which is short of the base 26 of the housing 12, and is disposed intermediate the pair of side walls 32 of the housing 12.

The housing 12 further has four feet 40 that are rubber and depend from the four corners 28 of the base 26 thereof, respectively.

The top wall 36 of the housing 14 has four bread slots 42 therethrough that are rectangular-shaped, parallel to, and spaced-apart from, each other, and communicate with the carriage 14.

The four bread slots 42 in the top wall 36 of the housing 12 comprise three fixed bread slots 44, each of which being of a different width for accommodating different sized and shaped breads, and an adjustable bread slot 46 for adjusting to accommodate for sized and shaped breads not fitting into any of the three fixed bread slots 44 thereof.

The carriage 14 is vertically movably mounted in the housing 12 and has bread guides 48 that align with the four of bread slots 42 in the top wall 36 of the housing 12, respectively, for maintaining the bread 18 in proper orientation relative to the housing 12.

The carriage 14 further has an arm 50 that extends fixedly outwardly therefrom, for vertical movement therewith, and through the throughslot 38 in the one end wall 30 of the housing 12 for vertical movement therethrough, to an end 52 that is in the ambient.

The arm 50 of the carriage 14 is normally biased to the upper extreme 39 of the throughslot 38 in the one end wall 30 of the housing 12.

The carriage 14 further has a lift knob 54 that is fixedly attached to the end 52 of the arm 50 thereof, for movement therewith, and is ergonomically-shaped for conforming to the thumb of the user so as to allow the arm 50 thereof to be selectively pushed down in the throughslot 38 in the one end wall 30 of the housing 12, to the lower extreme 41 thereof.

The carriage 14 further has a lift lock 56 that is disposed in proximity of the lower extreme 41 of the throughslot 38 in the one end wall 30 of the housing 12, and which locks the arm 50 thereof and the carriage 14 when the arm 50 thereof is pushed down to the lower extreme 41 of the throughslot 38 in the one end wall 30 of the housing 12 for allowing the bread 18 captured in the carriage 14 to be toasted until such time as the timer 20 releases the lift lock 56 allowing the carriage to be released and biased upwardly for removal of the toasted bread 22.

The timer 20 is operated by a timer knob 58 that is disposed on the front panel 34 of the housing 12, between the pair of end walls 30 of the housing 12, and in close proximity to the base 26 of the housing 12.

The audio alarm 24 is made audible by a speaker 60 that is disposed on the front panel 34 of the housing 12, between the timer knob 58 and the other end wall 30 of the housing 12, and in close proximity to the base 26 of the housing 12.

The color selector 26 is operated by a light button 62, a medium button 64, and a dark button 66 that are horizontally aligned and disposed on the front panel 34 of the housing 12, above the timer knob 58 and the speaker 60, and in close proximity to the top wall 36 of the housing 12 and the other end wall 30 of the housing 12.

The adjustable bread slot 46 in the top wall 36 of the housing 12 is adjusted by a slot size knob 68 that is disposed on the front panel 34 of the housing 12, just above, and in vertical alignment with, the timer knob 58.

It will be understood that each of the elements described above, or two or more together, may also find a useful application in other types of constructions differing from the types described above.

While the invention has been illustrated and described as embodied in a toaster being see-thru and having a plurality of different sized toast wells, one of which being adjustable, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A toaster for bread so as to form toasted bread with a color, comprising:
   a) a housing;
   b) a carriage operatively connected in said housing for racking the bread to be toasted,
   c) a timer operatively connected to said housing for setting how long the bread is to be toasted so as to form the toasted bread with the color;
   d) an audio alarm operatively connected to said housing and in electrical communication with said timer for activating eight seconds before termination of toasting so as to give a user ample time to reach said toaster up until toasting is terminated so as to prevent the toasted bread from getting cold, and
   e) a color selector operatively connected to said housing and in electrical communication with said carriage for selecting the color of the toasted bread;
   wherein said housing is rectangular-parallelepiped-shaped, and as a result thereof, has:
      i) a base that is horizontally-oriented and has four corners;
      ii) a pair of end walls that are vertically-oriented and extend upwardly from said base thereof,
      iii) a pair of side walls that are vertically-oriented and extend upwardly from said base thereof, of which one is a front panel; and
      iv) a top wall that is horizontally-oriented and extends across said pair of end walls thereof and said pair of side walls thereof;
   wherein said top wall of said housing has four bread slots therethrough that are rectangular-shaped, parallel to, and spaced-apart from, each other, and communicate with said carriage; and
   wherein said four bread slots in said top wall of said housing comprise:
      i) three fixed bread slots, each of which being of a different width for accommodating different sized and shaped breads, and
      ii) an adjustable bread slot for adjusting to accommodate for sized and shaped breads not fitting into any of said three fixed bread slots thereof.

2. The toaster as defined in claim 1, wherein said housing is completely transparent so as to form a transparent housing for allowing viewing of all surfaces of the bread as it is being toasted.

3. The toaster as defined in claim 2, wherein said transparent housing is made from heat-proof glass for preventing burns.

4. The toaster as defined in claim 1, wherein one end wall of said housing has a throughslot that is slender, extends vertically therethrough, from an upper extreme thereof, which is short of said top wall of said housing, to a lower extreme thereof, which is short of said base of said housing, and is disposed intermediate said pair of side walls of said housing.

5. The toaster as defined in claim 1, wherein said housing further has four feet that are rubber and depend from said four corners of said base thereof, respectively.

6. The toaster as defined in claim 1, wherein said carriage is vertically movably mounted in said housing and has bread guides that align with said four of bread slots in said top wall of said housing, respectively, for maintaining the bread in proper orientation relative to said housing.

7. The toaster as defined in claim 4, wherein said carriage further has an arm that extends fixedly outwardly therefrom, for vertical movement therewith, and through said throughslot in said one end wall of said housing for vertical movement therethrough, to an end that is in the ambient.

8. The toaster as defined in claim 7, wherein said arm of said carriage is normally biased to said upper extreme of said throughslot in said one end wall of said housing.

9. The toaster as defined in claim 7, wherein said carriage further has a lift knob that is fixedly attached to said end of said arm thereof, for movement therewith, and is ergonomically-shaped for conforming to the thumb of the user so as to allow said arm thereof to be selectively pushed down in said throughslot in said one end wall of said housing, to said lower extreme thereof.

10. The toaster as defined in claim 7, wherein said carriage further has a lift lock that is disposed in proximity of said lower extreme of said throughslot in said one end wall of said housing, and which locks said arm thereof and said carriage when said arm thereof is pushed down to said lower extreme of said throughslot in said one end wall of said housing for allowing the bread captured in said carriage to be toasted until such time as said timer releases said lift lock allowing said carriage to be released and biased upwardly for removal of the toasted bread therein.

11. The toaster as defined in claim 4, wherein said timer is operated by a timer knob that is disposed on said front panel of said housing, between said pair of end walls of said housing, and in close proximity to said base of said housing.

12. The toaster as defined in claim 11, wherein said audio alarm is made audible by a speaker that is disposed on said front panel of said housing, between said timer knob and the other end wall of said housing, and in close proximity to said base of said housing.

13. The toaster as defined in claim 12, wherein said color selector is operated by a light button, a medium button, and a dark button that are horizontally aligned and disposed on said front panel of said housing, above said timer knob and said speaker, and in close proximity to said top wall of said housing and said other end wall of said housing.

14. The toaster as defined in claim 1, wherein said adjustable bread slot in said top wall of said housing is adjusted by a slot size knob that is disposed on said front panel of said housing, just above, and in vertical alignment with, said timer knob.

* * * * *